United States Patent [19]

Wei et al.

[11] 3,714,147
[45] Jan. 30, 1973

[54] (2-OXO-AZETIDINO)BENZOPHENONE COMPOUNDS

[75] Inventors: Peter H. L. Wei, Springfield, Pa., Stanley C. Bell, Penn Valley, Pa.

[73] Assignee: American Home Products Corporation, New York, N.Y.

[22] Filed: June 10, 1971

[21] Appl. No.: 151,960

Related U.S. Application Data

[62] Division of Ser. No. 735,534, June 10, 1968, Pat. No. 3,644,401.

[52] U.S. Cl. .............................................. 260/239 A
[51] Int. Cl. ............................................ C07d 25/02
[58] Field of Search .................................. 260/239 A

*Primary Examiner*—Alton D. Rollins
*Attorney*—Vito Victor Bellino et al.

[57] ABSTRACT

The invention is directed to N-aryl-2-benzoyl-α-oxo-cyclopolymethylene amines which have anticonvulsant properties particularly in preventing convulsions such as are produced by metrazol or electric shock.

2 Claims, No Drawings

(2-OXO-AZETIDINO)BENZOPHENONE COMPOUNDS

This application is a division of our application Ser. No. 735,534, filed June 10, 1968, now U.S. Pat. No. 3,644,401, dated Feb. 22, 1972.

This invention relates to new and novel N-aryl-2-benzoyl-α-oxo-cyclopolymethylene amines and to a process for their preparation.

The compounds within the purview of the present invention are exemplified by those having the following formula:

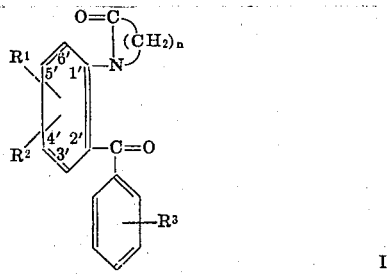

Where $R^1$ and $R^2$ are hydrogen, halogen, lower alkyl, lower alkoxy or sulfamoyl;

$R^3$ is hydrogen, halogen, lower alkyl and lower alkoxy;

$n$ is an integer from 2 to about 4, with the proviso that $R^1$ or $R^2$ is in the 60'-position when $n$ is 2.

As used herein, the terms "lower alkyl," "lower alkoxy" and the like, describe groups containing from one to about eight carbon atoms.

The compounds of this invention are depicted by structural formula (I) and generically designated as "N-aryl-2-benzoyl-α-oxocyclopolymethylene amines." A typical example of these compounds when $n = 2$ is 3,5-dichloro-2-(2-oxo-1-azetidinyl)benzophenone; when $n = 3$ is 1-(2-benzoyl-4-chlorophenyl)-2-pyrrolidinone; and when $n = 4$ is 1-(2-benzoyl-5-bromophenyl)-2-piperidinone.

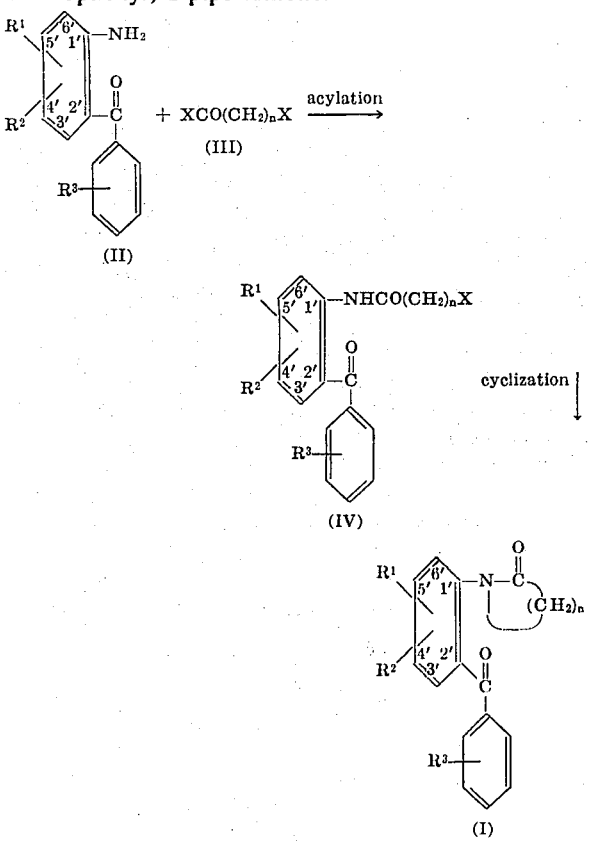

The new and novel compounds of this invention may be prepared by the process which is hereinafter schematically illustrated.

Where $R^1$–$R^3$ and $n$ are as defined above; and X is chlorine, bromine and iodine.

To prepare the N-aryl-2-benzoyl-α-oxo-cyclopolymethylene amines (I) of the present invention, a two step procedure is utilized. In the first step a 2-benzoylaniline (II) is contacted with a haloalkanoyl halide (III) in an organic solvent, such as chloroform, at a temperature range from about 0°C. up to the reflux temperature for a period of about 1 to about 4 hours. When the reaction is complete, the resulting intermediate compound 2-benzoylhaloalkanoyl anilide (IV) may be separated and recovered by well known means. For example, the reaction mixture is allowed to stand until separation of the product is complete. Thereafter, the solvent may be removed and the residual solid collected and washed with a small amount of organic solvent such as chloroform, hexane, benzene or ether, and the solid recrystallized from an appropriate solvent such as ethanol, acetonitrile or benzene.

When $n = 2$, the 6'-position of the 2-benzoylhaloalkanoylanilide (IV) must be blocked prior to carrying out the second step.

To prepare the N-aryl-2-benzoyl-α-oxo-cyclopolymethylene amines (I) of this invention, the above prepared 2-benzoylhaloalkanoyl anilide (IV) is heated with an alkali metal cyanide in an alkanol in the presence of a catalyst, for example sodium iodide, at a temperature range from about 50°C. to about 100°C., preferably the reflux temperature, for a period of about 1 to 20 hours affording the product a N-aryl-2-benzoyl-α-oxocyclopolymethylene amine (I) of this invention. The product may be separated and recovered by well known techniques. For instance, the inorganic material may be filtered off, the filtrate evaporated to dryness, and the residual solid recrystallized from a suitable organic solvent, such as ethanol. Preferably, this reaction is conducted with potassium cyanide, in ethanol, in the presence of a catalytic amount of sodium iodide, at reflux temperatures for about 6–20 hours.

The new and novel N-aryl-2-benzoyl-α-oxo-cyclopolymethylene amines (I) of the present invention have exhibited anticonvulsant properties, particularly as they prevent convulsion produced by metrazol or electric shock.

In the pharmacological evaluation of the biological activity of the compounds of this invention, the in vivo effects are tested as follows. The compound is administered orally to three mice (14 to 24 grams) at each of the following doses: 400, 127, 40 and 12.7 mg./kg. The animals are watched for a minimum of 2 hours during which time signs of general stimulation, (i.e., increased spontaneous motor activity, hyperactivity on tactile stimulation, twitching), general depression (i.e., decreased spontaneous motor activity, decreased respiration)autonomic activity (i.e., miosis, mydriasis, diarrhea) are noted. The experiment is terminated by subjecting each animal to a maximal electroshock to test for anti-convulsant activity. If the compound demonstrates no activity following oral administration, the procedure is repeated following intraperitoneal administration. The compounds of the present invention prevented convulsions due to electroshock at an oral dose of 400 milligrams per kilogram of host body weight.

Anti-metrazol activity is determined as follows. Compounds at a number of dose levels are administered orally to groups of six mice (3 males and 3 females). One hour later the animals are challenged with metrazol 125 mg./kg. i.p. The incidence of clonic and tonic convulsions and deaths is observed for one-half hour. Protection against convulsions and death is determined by comparison with controls run simultaneously.

The compounds of this invention in the above test procedures prevented the convulsant effects of electroshock and metrazol and have a calculated $ED_{50}$ of 201 to 400 milligrams per kilogram of hose weight. The effective dose for 50 percent of the hosts is termed $ED_{50}$. subligually When the compounds of this invention are employed as described above, they may be administered alone or in combination with pharmacologically acceptable carriers, the proportion of which is determined by the solubility and chemical nature of the compound, chosen route of administration and standard pharmacological practice. For example, they may be administered orally in the form of tablets or capsules containing such excipients as starch, milk, sugar, certain types of clay and so forth. They may be administered sublingually in the form of troches or lozenges in which the active ingredient is mixed with sugar and corn syrups; and then dehydrated sufficiently to make it suitable for pressing into a solid form. They may be administered orally in the form of solutions or they may be injected parenterally, that is, intramuscularly, intravenously or subcutaneously. For parenteral administration they may be used in the form of a sterile solution containing other solutes, for example, enough saline or glucose to make the solution isotonic.

The dosage of the present pharmacological agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects.

In order more clearly to disclose the nature of the present invention, specific examples of the practice of the invention are hereinafter given. It should be understood, however, that this is done solely by way of example and is intended neither to delineate the scope of the invention nor to limit the ambit of the appended claims.

EXAMPLE 1

The following example illustrates the preparation of 2'-benzoyl-3,4',6'-trichloropropionanilide and 3,5-dichloro-2-(2-oxo-1-azetidinyl)benzophenone.

Step A

A solution of 40 grams (g.) [0.15 moles (m.)] of 2-benzoyl-4,6-dichloroaniline and 25 g. (0.195 m.) of 3-chloropropionyl chloride in 400 ml. of chloroform is heated in a water bath at 60°C. for 1⅔ hours (hr.) and let stand at room temperature overnight. The solvent is removed and residual solid collected and washed with a small amount of chloroform. Recrystallization from ethanol affords pure 2'-benzoyl-3,4',6'-trichloropropionanilide weighing 49 g. and melting at 167°–9C.

Based on the formula $C_{16}H_{12}Cl_3NO_2$ it is calculated that the elemental analysis by weight would be 53.91 percent carbon, 3.39 percent hydrogen, 3.93 percent nitrogen and 29.84 percent chlorine. The product is analyzed and the content is found to be 54.37 percent carbon, 3.47 percent hydrogen, 4.27 percent nitrogen and 29.7 percent chlorine. The foregoing may be expressed:

Analysis calculated for $C_{16}H_{12}Cl_3NO_2$: C, 53.91; H, 3.39; Cl, 29.84; N, 3.93.

Found: C, 54.37; H, 3.47; Cl, 29.7; N, 4.27.

Step B

A solution of 10.7 g. (0.030 m.) of 2'-benzoyl-3,4'-6'-trichloropropionanilide and 2.34 g. (0.036 m.) of potassium cyanide in 220 ml. of 95 percent ethanol is heated to reflux in the presence of a catalytic amount of sodium iodide for 17 hours. Inorganic material is filtered off and, after removal of the solvent, the residual solid is recrystallized to afford 5.5 g. of 3,5-dichloro-2-(2-oxo-1-azetidinyl)benzophenone. When further recrystallized from benzene the product has a melting point of 112°–114°C.

Analysis calculated for $C_{16}H_{11}Cl_2NO_2$: C, 60.02; H, 3.46; Cl, 22.15; N, 4.38.

Found: C, 60.57; H, 3.75; Cl, 21.8; N, 4.06.

EXAMPLE 2

The following example illustrates the preparation of 2-benzoyl-4,4'-dichlorobutyranilide and 1-(2-benzoyl-4-chlorophenyl)-2-pyrrolidinone.

Step A

2-Benzoyl-4,4'-dichlorobutyranilide having a melting point of 91°–93°C. is prepared from 2-amino-5-chlorobenzophenone and 4-chlorobutyryl chloride according to the procedure of Example 1.

Analysis is calculated for $C_{17}H_{15}Cl_2NO_2$: C, 60.73; H, 4.50; Cl, 21.09; N, 4.17.

Found: C, 60.56; H, 4.29; Cl, 21.20; N, 3.78.

Step B

A mixture of 34.0 g of 2-benzoyl-4,4'-dichlorobutyranilide, 8.0 g. of potassium cyanide, 200 ml. of ethanol and 35 ml. of water is refluxed for 3 hours, cooled and filtered from impurities. On dilution with 100 ml. of water, 21.5 g. of product having a melting point of 125°–127°C. is obtained. The melting point remains the same after recrystallization from ethanol.

Analysis calculated for $C_{17}H_{14}ClNO_2$: C, 68.12; H, 4.71; Cl, 11.83; N, 4.67.

Found: C, 67.98; H, 4.55; Cl, 12.0; N, 4.63.

EXAMPLES 3—14

Proceeding as described in Example 1, but substituting the following starting materials for 2'-benzoyl-3,4',6'-trichloropropionanilide, the following products are obtained:

| EX. | Starting Material | Product |
| --- | --- | --- |
| 3 | 2'-(p-chlorobenzoyl)-4,4',6'-tribromobutyranilide | 1-[2-(p-chlorobenzoyl)-4,6-dibromophenyl]-2- |

| | | |
|---|---|---|
| 4 | 2'-benzoyl-5-bromo-3',4'-difluorovaleranilide | pyrrolidinone |
| | | 5,6-difluoro-2-(2-oxo-1-piperidinyl)-benzophenone |
| 5 | 2'-(p-methylbenzoyl)-3,4',6'-triiodopropionanilide | 3,5-diiodo-4'-methyl-2-(2-oxo-1-azetidinyl) benzophenone |
| 6 | 2'-benzoyl-4'-bromo-3,6'-dichloropropionanilide | 5-bromo-3-chloro-2-(2-oxo-1-azetidinyl)-benzophenone |
| 7 | 2'-benzoyl-4-chloro-4',6'-dimethylbutyranilide | 3,5-dimethyl-2-(2-oxo-1-pyrrolidinyl) benzophenone |
| 8 | 5-bromo-4'-butyl-2'-(m-methoxybenzoyl)-6'-fluoro-valeranilide | 5-butyl-3-fluoro-3'-methoxy-2-(2-oxo-1-piperidinyl)benzophenone |
| 9 | 3-chloro-4'-ethyl-2'-(p-ethylbenzoyl)-6'-sulfamoyl-propionanilide | 4',5-diethyl-3-sulfamoyl-2-(2-oxo-1-azetidinyl)benzo-phenone |
| 10 | 2'-benzoyl-3-chloro-4',6'-dimethoxypropionanilide | 3,5-dimethoxy-2-(2-oxo-1-azetidinyl)-benzophenone |
| 11 | 4-bromo-2'-(o-bromobenzoyl)-4',6'-dibutoxybutyranilide | 2'-bromo-3,5-dibutoxy-2-(2-oxo-1-pyrrolidinyl) benzophenone |
| 12 | 2'-benzoyl-5-chloro-6'-ethoxy-4'-propoxyvaleranilide | 3-ethoxy-5-propoxy-2-(2-oxo-1-piperidinyl) benzophenone |
| 13 | 2'-(p-butoxybenzoyl)-3'-fluoro-3-iodo-5'-methyl-propionanilide | 4'-butoxy-6-fluoro-4-methyl-2-(2-oxo-1-azetidinyl)benzophenone |
| 14 | 2'-benzoyl-3,4'-dichloro-6'-methoxypropionanilide | 5-chloro-3-methoxy-2-(2-oxo-1-azetidinyl)-benzophenone |

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. A compound selected from those having the formula

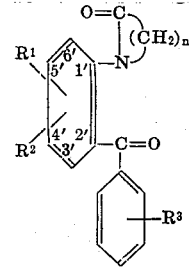

I where $R^1$ and $R^2$ are selected from the class consisting of hydrogen, halogen, lower alkyl having from one to eight carbon atoms, lower alkoxy having from one to eight carbon atoms, and sulfamoyl; and $R^3$ is selected from the class consisting of hydrogen, halogen, lower alkyl having from one to eight carbon atoms, and lower alkoxy having from one to eight carbon atoms.

2. A compound as defined in claim 1 which is 3,5-dichloro-2-(2-oxo-1-azetidinyl)benzophenone.

* * * * *

UNITED STATES PATENT OFFICE
CERTIFICATE OF CORRECTION

Patent No. 3,714,147                Dated January 30, 1973

Inventor(s) Peter H. L. Wei and Stanley C. Bell

It is certified that error appears in the above-identified patent and that said Letters Patent are hereby corrected as shown below:

At column 6 lines 10-19 the structural formula of Claim 1 should read as follows:

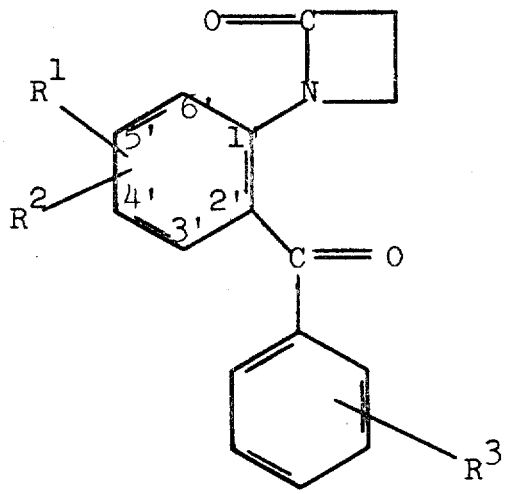

Signed and sealed this 10th day of July 1973.

(SEAL)
Attest:

EDWARD M. FLETCHER, JR.               Rene Tegtmeyer
Attesting Officer                     Acting Commissioner of Patents